United States Patent
Mei et al.

(10) Patent No.: US 12,200,529 B2
(45) Date of Patent: Jan. 14, 2025

(54) METHODS AND SYSTEMS FOR IMPROVED WLAN CHANNEL INFORMATION GATHERING MECHANISM

(71) Applicants: HUAWEI TECHNOLOGIES CANADA CO., LTD., Kanata (CA); The University of Western Ontario, London (CA)

(72) Inventors: Jie Mei, London (CA); Xianbin Wang, London (CA); Yan Xin, Kanata (CA); Kwok Shum Au, Kanata (CA); Jung Hoon Suh, Kanata (CA); Osama Aboul-Magd, Kanata (CA)

(73) Assignees: HUAWEI TECHNOLOGIES CANADA CO., LTD., Kanata (CA); THE UNIVERSITY OF WESTERN ONTARIO, London (CA)

( * ) Notice: Subject to any disclaimer, the term of this patent is extended or adjusted under 35 U.S.C. 154(b) by 342 days.

(21) Appl. No.: 17/698,864

(22) Filed: Mar. 18, 2022

(65) Prior Publication Data
US 2023/0300649 A1 Sep. 21, 2023

(51) Int. Cl.
*H04W 24/10* (2009.01)
*H04B 7/06* (2006.01)
(Continued)

(52) U.S. Cl.
CPC .......... *H04W 24/10* (2013.01); *H04B 7/0617* (2013.01); *H04B 7/0626* (2013.01); *H04L 25/0212* (2013.01); *H04W 84/12* (2013.01)

(58) Field of Classification Search
None
See application file for complete search history.

(56) References Cited

U.S. PATENT DOCUMENTS 10,136,262 B2 * 11/2018 Bhanage .............. H04W 4/029
11,336,487 B1 * 5/2022 Dakshinkar .......... H04L 5/0048
(Continued)

FOREIGN PATENT DOCUMENTS

WO 2021233233 A1 11/2021

OTHER PUBLICATIONS

IEEE P802.11be D1.3, Part 11: Wireless LAN Medium Access Control (MAC) and Physical Layer (PHY) Specifications. Amendment 8: Enhancements for extremely high throughput (EHT), Nov. 2021.
(Continued)

*Primary Examiner* — Otis L Thompson, Jr.

(57) ABSTRACT

The present disclosure provides for methods and systems for improved channel information gathering mechanism. An aspect of the disclosure provides a method. The method includes sending, to one or more stations (STAs), a request for channel information. The channel information being related to one or more channels between an access point (AP) and the one or more STAs. The method further includes receiving, from the one or more (STA), one or more physical layer (PHY) protocol data units (PPDUs). The PPDUs includes channel feature information (CFI) associated with the one or more channels. In some embodiments, the request includes a beamforming report poll (BFRP) trigger frame having a user information field. The user information subfield indicating one or more thresholds associated with one or more parameters of the channel feature information.

20 Claims, 11 Drawing Sheets

100

(51) Int. Cl.
  *H04L 25/02* (2006.01)
  *H04W 84/12* (2009.01)

(56) References Cited

U.S. PATENT DOCUMENTS

| | | | | |
|---|---|---|---|---|
| 2006/0165008 | A1* | 7/2006 | Li | H04B 17/373 |
| | | | | 370/252 |
| 2011/0069629 | A1* | 3/2011 | Breit | H04B 17/24 |
| | | | | 370/252 |
| 2011/0199946 | A1* | 8/2011 | Breit | H04L 25/03343 |
| | | | | 455/226.1 |
| 2011/0317674 | A1 | 12/2011 | Park et al. | |
| 2013/0094488 | A1* | 4/2013 | Choi | H04W 16/28 |
| | | | | 370/338 |
| 2013/0223427 | A1* | 8/2013 | Sohn | H04L 5/0048 |
| | | | | 370/338 |
| 2016/0142122 | A1* | 5/2016 | Merlin | H04B 7/0626 |
| | | | | 375/267 |
| 2016/0165607 | A1* | 6/2016 | Hedayat | H04W 24/00 |
| | | | | 370/338 |
| 2016/0233932 | A1* | 8/2016 | Hedayat | H04L 5/0048 |
| 2016/0261327 | A1* | 9/2016 | Merlin | H04L 1/0027 |
| 2016/0316424 | A1* | 10/2016 | Jia | H04W 48/18 |
| 2018/0205441 | A1* | 7/2018 | Asterjadhi | H04W 72/044 |
| 2018/0310195 | A1* | 10/2018 | Zhang | H04L 5/0057 |
| 2019/0028168 | A1* | 1/2019 | Vermani | H04B 7/024 |
| 2020/0076552 | A1 | 3/2020 | Cherian et al. | |
| 2021/0044333 | A1* | 2/2021 | Jiang | H04B 7/0619 |
| 2021/0288779 | A1* | 9/2021 | Da Silva | H04L 5/0051 |
| 2022/0158696 | A1* | 5/2022 | Jeon | H04B 7/0404 |
| 2022/0182119 | A1* | 6/2022 | Ravichandran | H04B 7/0626 |
| 2022/0416971 | A1* | 12/2022 | Noh | H04W 48/10 |
| 2023/0086669 | A1 | 3/2023 | Yu | |

OTHER PUBLICATIONS

IEEE 802.11ax, Part 11: Wireless LAN Medium Access Control (MAC) and Physical Layer (PHY) Specifications Amendment 1: Enhancements for High-Efficiency WLAN, IEEE Computer Society, 2021.

Bellalta et al., AP-initiated multi-user transmissions in IEEE 802.11ax WLANs, Ad Hoc Networks, vol. 85, 2019, pp. 145-159.

Li et al., NLOS Identification and Mitigation Based on Channel State Information for Indoor WiFi Localization. IET Communications, Nov. 4, 2017.

* cited by examiner

| Trigger Type subfield value | Trigger frame variant |
|---|---|
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8-15 | Reserved |

FIG. 5

| AID12 702 | RU Allocation 704 | UL FEC Coding Type 706 | UL MCS 708 | UL DCM 710 | SS Allocation/ RA-RU Information 712 | UL Target Receive Power 714 | Extension Indication 716 | Feedback Segment Retransmission Bitmap 718 | Delayed CFI Feedback Threshold 720 |
|---|---|---|---|---|---|---|---|---|---|
| 12 | 8 | 1 | 4 | 1 | 6 | 7 | 1 | 8 | 8 or more |

Bits:

| AID11 1002 | Partial BW info 1004 | Reserved 1006 | Nc Index 1008 | Feedback type and Ng 1010 | Disambiguation 1012 | Codebook Size 1014 | Reserved 1016 | CSI Feedback Indication 1018 | Real-time CSI Indication 1020 | Delayed CFI Indication 1022 |
|---|---|---|---|---|---|---|---|---|---|---|
| B0   B10 B11 B19 | | B20 | B21 B24 B25 | B26 | B27 | B28 | B29 | B30 | B31 | |
| 11 | 9 | 1 | 4 | 2 | 1 | 1 | 1 | 2 | n1 | n2 |

Bits:

FIG. 10

METHODS AND SYSTEMS FOR IMPROVED WLAN CHANNEL INFORMATION GATHERING MECHANISM

CROSS-REFERENCE TO RELATED APPLICATIONS

This is the first application filed for the present invention.

FIELD OF THE INVENTION

The present invention pertains to the field of communication networks, and in particular to methods and systems for improved WLAN channel information gathering mechanism.

BACKGROUND

Existing channel sounding protocols may be inadequate for future systems (e.g., future wireless local area networks (WLANs). In future systems, the number of coordinated access points (APs), the number of antennas at transmitters and receivers, and the operation bandwidth are likely to increase. In such environments, using existing sounding protocols, e.g., protocols used in 802.11, may lead to increased overhead and complexity. Further, using existing channel sounding protocols for fast changing channels (e.g., channels with fast-changing signal environments) may lead to collection of channel state information (CSI) that are outdated or inaccurate. In addition, existing channel sounding protocols may lack flexibility that may be needed under different channel conditions. For example, in Wi-Fi scenarios, some user stations (STAs) are semi-static, and thus, use of routine and static CSI feedback may be unnecessary.

Therefore, there is a need for methods and systems for improved channel information gathering mechanism that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

The present disclosure provides methods, system and apparatus for channel information gathering. According to a first aspect, a method performed by an access point (AP) is provided. The method includes sending, to one or more stations (STAs), a request for channel information. The request being associated with a first channel sounding phase. The channel information being related to one or more channels between the AP and the one or more STAs. The method further includes receiving, from the one or more (STA), one or more physical layer (PHY) protocol data units (PPDUs). The PPDUs includes channel feature information (CFI) associated with the one or more channels. The method may provide may reduce overhead associated with channel sounding.

In some embodiments of the first aspect, the request includes a beamforming report poll (BFRP) trigger frame. The BFRP trigger frame includes a user information field which further includes a first subfield. The first subfield indicates one or more thresholds associated with one or more parameters of the channel feature information. In some embodiments of the first aspect, the received channel feature information is based on the one or more thresholds. The method may limit CFI feedback based on the one or more thresholds.

In some embodiments of the first aspect, the presence of the first subfield is indicated by a second subfield in the user information field. In some embodiments of the first aspect, the one or more parameters of the channel feature information indicate one or more of: a level of channel variation, a level of frequency-domain correlation, and temporary sparsity level of channel impulse response (CIR).

In some embodiments of the first aspect, the channel feature information is in data payload portion of the one or more PPDUs. In some embodiments of the first aspect, the channel information includes information indicative of one or more of: channel state information (CSI), channel quality information, channel frequency response (CFR), channel impulse response (CIR), a level of channel variation, a level of frequency domain correlation, and a temporary sparsity level of CIR.

In some embodiments of the first aspect, the method further includes receiving, from the one or more STA, one or more beamforming report (BR) frames. The BR frames include real-time channel state information (CSI) based on the request of the first channel sounding phase. In some embodiments of the first aspect, the method further includes sending, to the one or more STAs, a second request for at least one of: additional real-time CSI feedback and additional CFI feedback. The second request being associated with a second channel sounding phase subsequent to the first sounding phase. The second request includes a null data packet announcement (NDPA) frame. The NDPA frame further includes a STA info field which further includes a first subfield indicating the request. The second request is further based on at least one of: the received real-time CSI and the received CFI. The method may provide for feedback of channel information as needed.

In some embodiments of the first aspect, the method further includes receiving, from the one or more STAs, one or more additional BR frames including the additional real-time CSI. In some embodiments of the first aspect, the method further includes receiving, from the one or more STAs, one or more additional PPDUs including the additional CFI. In some embodiments of the first aspect, the method further includes receiving, from the one or more STAs, one or more additional BR frames including the additional real-time CSI and one or more additional PPDUs including the additional CFI.

In some embodiments of the first aspect, the STA info field includes a second subfield for indicating the type of information the one or more STAs should feedback for the additional real-time CSI. The type of information includes one or more of: compressed CSI, channel frequency response (CFR), and channel impulse response (CIR).

In some embodiments of the first aspect, the STA info field includes a second subfield for indicating the type of information the one or more STAs should feedback for the additional CFI. The type of information includes one or more of: compressed CSI, channel frequency response (CFR), channel impulse response (CIR), a level of channel variation, a level of frequency domain correlation, and a temporary sparsity level of CIR.

According to a second aspect, another method performed by an AP is provided. The method includes sending, to one or more stations (STAs), a request for at least one of: real-time channel state information (CSI) feedback and channel feature information (CFI) feedback. The request includes a null data packet announcement (NDPA) frame having a STA info field. The STA info field includes a first subfield indicating the request. The method further includes receiving, from the one or more STA, channel information including at least one of: the real-time CSI and the CFI. The method may provide for feedback of channel information (e.g., real-time CSI and CFI) as needed.

In some embodiments of the second aspect, the receiving includes receiving one or more beamforming report (BR) frames including the real-time CSI. In some embodiments of the second aspect, the receiving includes receiving one or more physical layer (PHY) protocol data units (PPDUs) including the CFI. In some embodiments of the second aspect, the receiving includes receiving one or more BR frames including the real-time CSI and one or more PPDUs including the CFI.

In some embodiments of the second aspect, the STA info field includes one or more additional subfields for indicating the type of information the one or more STAs should feedback for the real-time CSI and the CFI. The type of information includes one or more of: compressed CSI, channel frequency response (CFR), channel impulse response (CIR), a level of channel variation, a level of frequency domain correlation, and a temporary sparsity level of CIR.

According to a third aspect a method performed by a STA is provided. The method includes receiving, from an access point (AP), a request for channel information. The request being associated with a first channel sounding phase. The channel information being related to a channel between the AP and the STA. The method further includes sending, to the AP, a physical layer (PHY) protocol data unit (PPDU) including channel feature information (CFI) associated with the channel. The method may provide for reduced overhead associated with channel sounding.

In some embodiments of the third aspect, the request includes a beamforming report poll (BFRP) trigger frame having a user information field. The user information field includes a first subfield for indicating one or more thresholds associated with one or more parameters of the CFI. The CFI sent to the AP being based on the one or more thresholds. The one or more parameters of the CFI further indicates one or more of: a level of channel variation, a level of frequency-domain correlation, and temporary sparsity level of channel impulse response (CIR). The method may limit CFI feedback based on the one or more thresholds.

In some embodiments of the third aspect, the method further includes sending, to the AP, a beamforming report (BR) frame. The BR frame includes channel state information (CSI) based on the request for channel information. In some embodiments of the third aspect, the method further includes receiving, from the AP, a second request for at least one of: additional real-time CSI feedback and additional CFI feedback. The second request being associated with a second channel sounding phase subsequent to the first sounding phase. In some embodiments, the second request includes a null data packet announcement (NDPA) frame having a STA info field. In some embodiments, the STA info field includes a first subfield indicating the request. In some embodiments, the request is based on at least one of: the sent real-time CSI and the sent CFI. The method may provide for feedback of channel information as needed.

In some embodiments of the third aspect, the method further includes sending an additional BR frame including the additional real-time CSI. In some embodiments of the third aspect, the method further includes sending an additional PPDU including the additional CFI. In some embodiments of the third aspect, the method further includes sending an additional BR frame including the additional real-time CSI and an additional PPDUs including the additional CFI.

In some embodiments of the third aspect, the STA info field includes one or more additional subfields for indicating the type of information the STA should feedback for the additional real-time CSI and the additional CFI. In some embodiments, the type of information includes one or more of: compressed CSI, channel frequency response (CFR), channel impulse response (CIR), a level of channel variation, a level of frequency domain correlation, and a temporary sparsity level of CIR.

According to a fourth aspect, another method performed by a STA is provided. The method includes receiving, from an access point (AP), a request for at least of: real-time channel state information (CSI) feedback and channel feature information (CFI) feedback. The request includes a null data packet announcement (NDPA) frame having a STA info field. The STA info field includes a first subfield indicating the request. The method further includes sending, to the AP, channel information including at least one of: the real-time CSI and the CFI. The method may provide for feedback of channel information (e.g., real-time CSI and CFI) as needed.

In some embodiments of the fourth aspect, the sending includes sending a beamforming report (BR) frame including the real-time CSI. In some embodiments of the fourth aspect, the sending includes sending a physical layer (PHY) protocol data unit (PPDU) including the CFI. In some embodiments of the fourth aspect, the sending includes sending a BR frame including the real-time CSI and a PPDU including the CFI.

In some embodiments of the fourth aspect, the STA info field includes one or more additional subfields for indicating the type of information the STA should feedback for the real-time CSI and the CFI. In some embodiments, the type of information includes one or more of: compressed CSI, channel frequency response (CFR), channel impulse response (CIR), a level of channel variation, a level of frequency domain correlation, and a temporary sparsity level of CIR.

According to a fifth aspect, an apparatus is provided. The apparatus includes modules configured to perform the methods according to one or more aspects described herein.

According to a sixth aspect, an apparatus is provided, where the apparatus includes: a memory, configured to store a program; a processor, configured to execute the program stored in the memory, and when the program stored in the memory is executed, the processor is configured to perform the methods according to one or more aspects described herein.

According to a seventh aspect, a computer readable medium is provided, where the computer readable medium stores program code executed by a device, and the program code is used to perform the methods according to one or more aspects described herein.

According to a eighth aspect, a chip is provided, where the chip includes a processor and a data interface, and the processor reads, by using the data interface, an instruction stored in a memory, to perform the methods according to one or more aspects described herein.

Other aspects of the disclosure provide for apparatus, and systems configured to implement the methods according to the first aspect disclosed herein. For example, wireless stations and access points can be configured with machine readable memory containing instructions, which when executed by the processors of these devices, configures the device to perform the methods according to one or more aspects disclosed herein.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 5 illustrates trigger type subfield encoding.

FIG. 7 illustrates an enhanced user info field format in a beamforming report poll (BFRP) trigger frame, according to an embodiment of the present disclosure.

FIG. 10 illustrates an enhanced STA info field format, according to an embodiment of the present disclosure.

It will be noted that throughout the appended drawings, like features are identified by like reference numerals.

DETAILED DESCRIPTION

Figure 1:
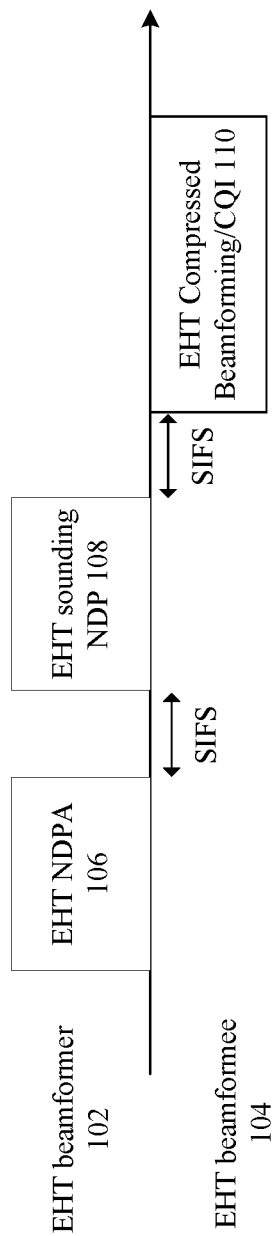
FIG. 1 illustrates an extremely high throughput (EHT) non-trigger-based (non-TB) sounding sequence procedure.

As discussed earlier, in future systems (e.g., future wireless local area networks (WLANs)), the number of coordinated APs, the number of antennas at transmitters and receivers, and the operation bandwidth are likely to increase. In such environments, using existing sounding protocols, e.g., in 802.11, may result in relatively large airtime overhead for CSI feedback. Accordingly, using existing channel sounding protocols, in future WLANs, may further lead to increased overhead and complexity. For example, collection of CSI at the AP (e.g., when the CSI is estimated in STAs until the CSI is fully or almost fully collected in the AP), using existing channel sounding may cause increased overhead and require increased complexity.

CSI may reflect the wireless signal propagation characteristics for a channel between a transmitter and a receiver at certain carrier frequencies, as may be appreciated by a person skilled in the art. CSI may represent how an electromagnetic signal propagates from a transmitter to a receiver and the combined effect of scattering, fading, and power decay with distance of the signal.

Using existing channel sounding protocols for fast changing channels (e.g., channels with fast-changing signal environments) may lead to collection of CSI that are outdated or inaccurate, or both. Such outdated and inaccurate information may be problematic when the AP conducts further operations with the associated STAs.

In addition, existing channel sounding protocols may lack flexibility that may be needed under different channel conditions. For example, in Wi-Fi scenarios, some user STAs are semi-static, and thus, use of routine and static CSI feedback (based on existing channel sounding protocol) may be unnecessary.

Accordingly, enhanced channel sounding protocols are desired to obviate or mitigate one or more limitations described.

Embodiments described herein may provide for an enhanced channel sounding protocol that is adaptive to the dynamic and STA-specific channel conditions in Wi-Fi networks. Further, embodiment described herein may provide for an enhanced channel sounding protocol that can reduce signaling overhead of channel sounding while ensuring accuracy of CSI.

Embodiments described herein may provide for enhanced CSI gathering operations that consider channel-related information gathering at different levels based on latency tolerance of the information to be gathered. In some embodiments, delayed channel feature information (CFI) feedback can be piggybacked with a PPDU that carries data payload. Such embodiments may reduce signaling overhead.

Embodiment described herein may further consider multiple CSI compression schemes that may be needed for taking advantage of channel's feature, the details of which are described herein.

Embodiments described herein may provide for enhanced channel information gathering schemes that are based on the latency tolerance of channel information to be gathered. In some embodiments, the channel information gathering scheme can be based on an opportunistic CFI feedback. In opportunistic CFI feedback schemes, the sending of CFI feedback can be based on a trigger condition set by an AP. For example, when channel conditions satisfy the trigger condition, the STA subject to the trigger condition is to send the CFI feedback. In some embodiments, the trigger condition can be based on a substantial change of the channel conditions. In some embodiments, the trigger condition can be based on any appropriate change of the channel conditions.

In some embodiments, the channel information gathering scheme can be based on a delayed CFI feedback. For example, delayed CFI can be transmitted by piggybacking in the uplink data payload.

In 802.11be, CSI for single user (SU) multiple-input multiple-output (MIMO) or multi-user (MU) MIMO beamforming can be acquired through channel sounding protocols.

CSI gathering schemes can be is used to evaluate signal transmission environment. For example, CSI gathering schemes can be used for evaluating signal transmission environment for SU-MIMO or MU-MIMO OFDMA transmissions. Before downlink (DL) beamforming transmissions, an AP may need to have some knowledge of CSI of each active user STA. Upon obtaining such knowledge, the AP can then send a null data packet announcement (NDPA) frame followed by a null data packet (NDP).

FIG. 1 illustrates an EHT non-trigger-based (non-TB) sounding sequence procedure. The sounding sequence procedure 100 may be similar to the EHT non-TB sounding sequence in IEEE 802.11be D1.0, FIG. 35-17. The procedure 100 may comprise an EHT beamformer 102 initiating a sounding sequence (i.e., the procedure 100) with a single EHT beamformee 104. The EHT beamformer can be an AP, for example. The EHT beamformer 102 initiates the sounding sequence by sending an EHT NDPA frame 106 to the EHT beamformee 104. The EHT beamformee can be a STA for example. The EHT NDPA frame 106 can indicate or carry the address information of a single STA (e.g., the EHT beamformee).

The procedure may further include, short interframe spacing (SIFS) time units after sending the EHT NDPA 106, EHT beamformer 102 sending an EHT sounding NDP 108 to the EHT beamformee 104. SIFS time units after receiving the EHT sounding NDP 108, the EHT beamformee 104 can send a channel quality information (CQI) feedback 110 (EHT compressed beamforming/CQI) to the EHT beamformer 102.

Figure 2:
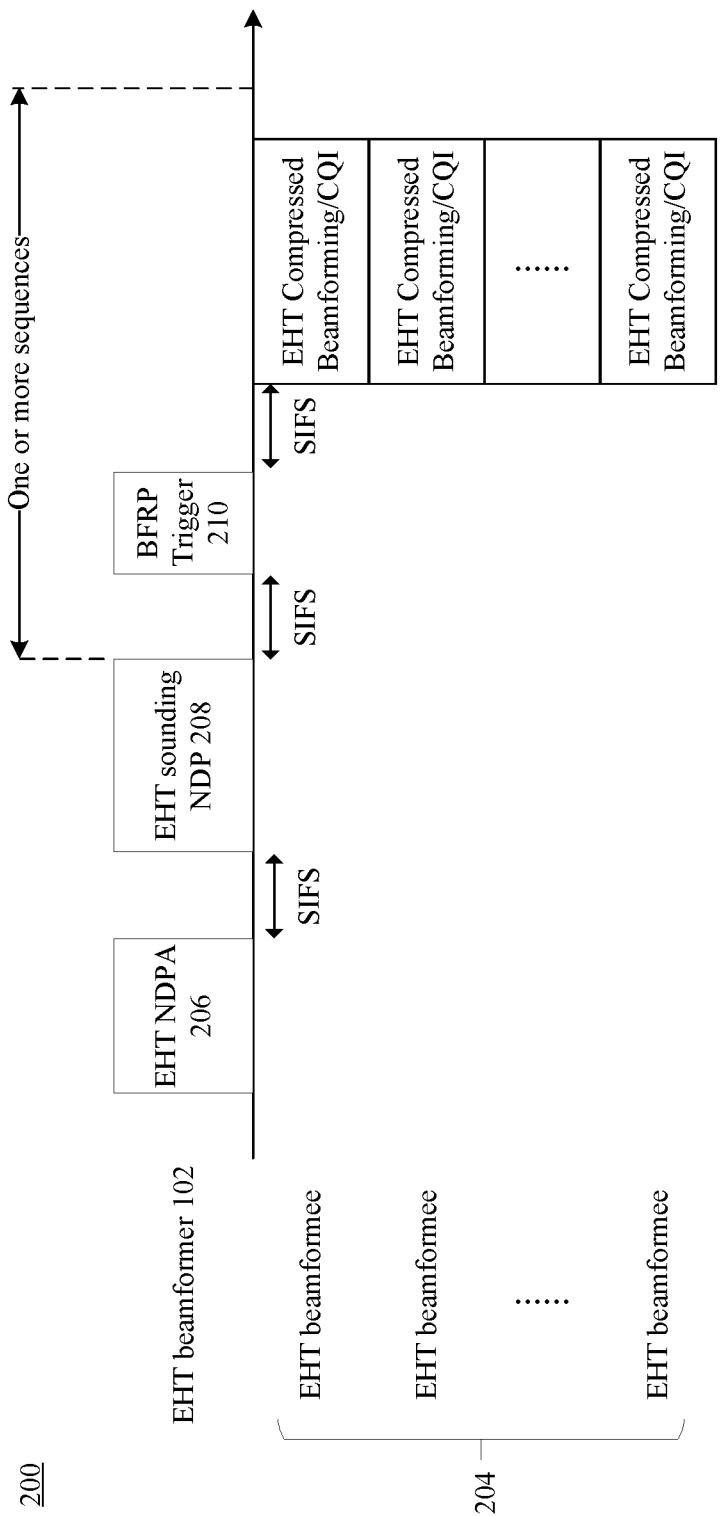
FIG. 2 illustrates an EHT TB sounding sequence procedure.

FIG. 2 illustrates an EHT TB sounding sequence procedure. The sounding sequence procedure 200 may be similar to the EHT TB sounding sequence in IEEE 802.11be D1.0, FIG. 35-18. The sounding sequence procedure 200 may apply to the case of DL MU-MIMO. The procedure 200 may involve soliciting feedback from multiple STAs 204 (e.g., a plurality of EHT beamformees). The procedure 200 may include, sending, by the EHT beamformer 102, an EHT NDPA frame 206 to each of the plurality of EHT beamformees 204. The EHT NDPA frame 206 can include more than one STA Info fields for indicating the address information of each of the plurality of EHT beamformees 204. The EHT NDPA frame 206 can further include an RA field set to the broadcast address.

The procedure my further include, short interframe spacing (SIFS) time units after sending the EHT NDPA 206, EHT beamformer 102 can send an EHT sounding NDP 208 to each of the plurality of EHT beamformees 204. SIFS time units thereafter, the EHT beamformer 102 can send a Beamforming Report Poll (BFRP) trigger frame 210 to each of the plurality of EHT beamformees. In response to receiving the BFRP trigger frame 210, SIFS time units thereafter, each of the plurality of the EHT beamformee 204 can send its compressed beamforming reports (e.g., EHT compressed beamforming/CQI) to the EHT beamformer 102. A person skilled in the art may appreciated that the sending of the BFRP trigger frame 210 and the receiving of the compressed beamforming reports may involve one or more sequences.

As described herein, existing sounding protocols may be inadequate for future systems (e.g., future WLANs) as these protocols have a number of limitations. Embodiments may provide enhanced channel sounding protocols that obviate or mitigate one or more limitation of prior arts.

Embodiments described herein may provide for an adaptive channel sounding mechanism or protocol that may allow one or more beamformees to feedback channel information based on latency tolerance of the channel information (or channel-related information) to be gathered. Embodiments described herein may provide an enhanced channel sounding protocol that improves the accuracy and timeliness of channel information gathering at the AP side while minimizing the overhead of channel sounding.

In some Wi-Fi scenarios, change in channel information can occur over a large timescale (e.g., hundreds of milliseconds). The change in channel information can be substantial or of substantial nature. Such 'slow-changing' channel information can be viewed as having relatively high tolerance with respect to feedback delay, indicating that the channel information has not undergone a substantial change or a change of substantial nature.

Based on the tolerance nature of the channel information with respect to feedback delay, channel information can be categorized as long-term channel information or real-time channel information. The long-term channel information can be referred to as delayed CFI (e.g., channel information that have high tolerance with respect to feedback delay (i.e., slow changing channel information). The real-time channel information may refer to information, such as channel state information (CSI), that needs to be fed back immediately or soon after channel sounding, which may be referred to as real-time CSI.

In some embodiments described herein, channel feature information can be collected by delayed feedback, in which, one or more STAs can opportunistically piggyback the CFI in the uplink payload (to the AP) once a trigger condition is satisfied. CFI that is collected by delayed feedback can be referred to as delayed CFI. As may be appreciated by a person skilled in the art, CFI can include information indicative of one or more of: CQI, CSI, channel frequency response (CFR) in frequency domain, channel impulse response (CIR) in time domain, channel feature parameters, and other channel-related information. Channel feature parameters can include information indicative of one or more of: a level of channel variation, a level of frequency-domain correlation, and a temporary sparsity level of CIR.

On the other hand, real-time CSI can be fed back, by one or more STAs to the AP, using any appropriate channel sounding protocol.

Compared with the real-time CSI feedback, the overhead in the delayed feedback (comprising CFI) may be lower since the feedback information in the delayed feedback can be carried with an uplink (UL) data payload.

Figure 3:
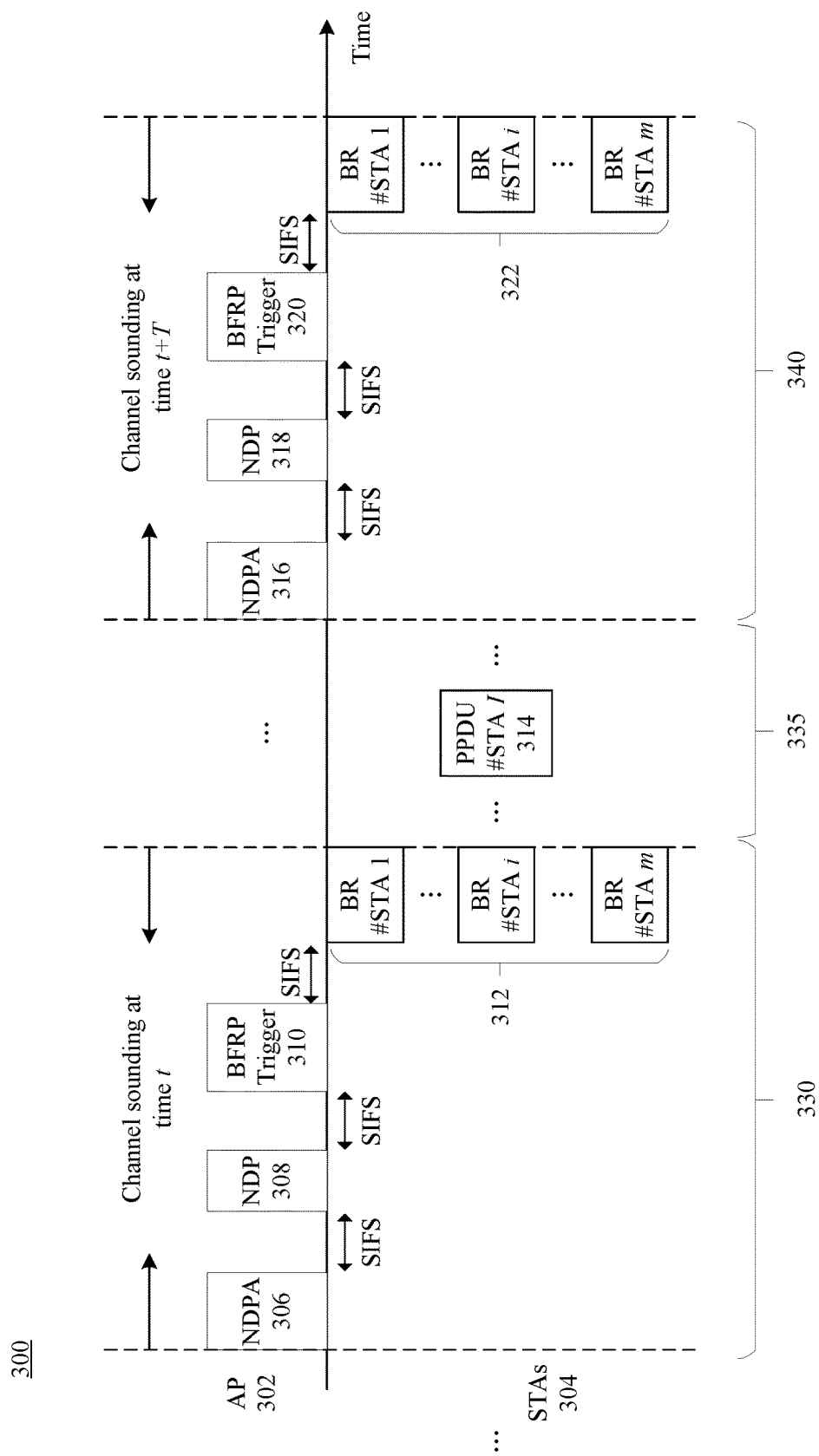
FIG. 3 illustrates a procedure for adaptive channel sounding feedback, according to an embodiment of the present disclosure.

FIG. 3 illustrates a procedure for adaptive channel sounding feedback, according to an embodiment of the present disclosure. The CSI gathering procedure 300 can comprise an immediate or a real-time CSI feedback portion 330 which may be based on collecting real-time CSI, at time t, for example. The procedure 300 can further comprise a delayed CFI feedback portion 335, which may be based on collecting CFI. In some embodiments, the procedure 300 can further comprise a second immediate or real-time CSI feedback portion 340, at time t+T.

As further described herein, in the real-time CSI feedback portion 330, in response to receiving the BFRP trigger frame 310 from the AP 302, each of one or more STAs 304 can send real-time CSI to the AP 302 using a beamforming report (BR) frame (e.g., one or more BF frames 312).

Similarly, in the delayed CFI feedback portion 335, in response to receiving the BFRP trigger frame 310 from the AP 302, one or more of the STAs 304 can further feedback CFI by piggybacking the CFI in an uplink PPDU.

In an embodiment, the adaptive channel sounding procedure 300 includes, initiating, by the AP 302, the channel sounding procedure. The AP 302 can initiate the channel sounding procedure by sending an NDPA 306 to one or more STAs 304. The NDPA frame 306 can include information indicative of address of one or more target STAs (e.g., the one or more STAs 304) for channel measurement.

The procedure 300 further includes, SIFS time units after sending the NDPA 306, sending, by the AP 302, an NDP frame 308 to the one or more STAs 304. The NDP frame 308 can indicate to each one of the one or more STAs 304 to estimate the downlink channels between the STA and the AP 302.

In some embodiments, each STA of the one or more STAs 304 can leverage the preamble in the NDP frame 308 to estimate the complex-valued channel vectors between the AP 302 and itself.

The measured Channel Frequency Response (CFR) between an AP (e.g., AP 302) and STA m (e.g., a STA of the one or more STAs 304) on the $k^{th}$ subcarrier can be denoted as $H_{m,k} \in \mathbb{C}^{N_T \times N_R}$ where $N_T$ and $N_R$ are the number of transmit antennas and the number of receive antennas, respectively.

The channel impulse response (CIR) of the channel between the $x^{th}$ receiver antenna of STA m and the $y^{th}$ transmitter antenna of the AP can be denoted as: $h_{m,x,y}^{CIR}(\tau) = \sum_{l=1}^{L} \alpha_{m,x,y,l} \cdot \delta(\tau - \tau_{m,x,y,l})$, where L is the number of channel paths, $\alpha_{m,x,y,l}$ and $\tau_{m,x,y,l}$ are the attenuation factor and the path delay of the $l^{th}$ path, respectively.

In practice, CIR can be obtained by taking an inverse Fourier transform (IFFT) of CFR. The CIR of channel between the $x^{th}$ receiver antenna of STA m and the $y^{th}$ transmitter antenna of the AP can be represented as a vector according to the following equation:

$$h_{m,x,y}^{CIR} = [\beta_{m,x,y,1}, \ldots, \beta_{m,x,y,l}, \ldots, \beta_{m,x,y,K}]^T \in \mathbb{C}^{K \times 1} \quad (1)$$

where, $$\beta_{m,x,y,l} = \begin{cases} \alpha_{m,x,y,l}, & \text{if } k = \lfloor \tau_{m,x,y,l}/T_S \rfloor, \\ 0, & \text{otherwises,} \end{cases}$$

In equation (1), $T_S$ is the time interval of signal sampling and $\lfloor \cdot \rfloor$ is the floor function (i.e., rounding up the input to the nearest integer less than or equal to that input).

After CSI (e.g., real-time CSI) measurement, since reporting the full measured raw channel vectors $H_{m,k}$ to the AP 302 may include significant overhead, in some embodiments, the relevant one or more STAs (e.g., one or more STAs 304) that intend to feedback real-time CSI can employ tone grouping to compress the estimated channel vectors.

In an embodiment, the AP 302 can send a beamforming report poll (BFRP) trigger frame 310 to coordinate a group of one or more STAs (e.g., one or more STAs 304) to send their compressed real-time CSI in beamforming report (BR) frames through uplink MU-MIMO. Accordingly, in an embodiment, SIFS time units after sending the NDP frame 308, the AP 302 can send a BFRP Trigger frame 310 to one or more of STAs 304. In response to the BFRP trigger frame 310, SIFS time units after receiving the BFRP Trigger frame 310, each of the one or more STAs 304 can send one or more BR frames 312 to the AP 302. Each BR frame of the BR frames 312 may indicate real-time CSI associated with the AP 302 and the corresponding STA of the one or more STAs 304.

After receiving the one or more BR frames 312, the AP 302 can decode the BR frames 312 and identify the intended one or more STAs by using the MAC address in the corresponding BR frames. Thus, for STA m, its decoded CSI in the $k^{th}$ subcarrier at the AP side can be denoted as $\tilde{H}_{m,k}$.

After receiving and decoding all intended STAs' BR frames, the AP 302 can obtain information required for downlink MU-MIMO transmission.

In some embodiments, after channel estimation as described herein, each STA of the one or more STAs 304 can calculate or obtain the CFI. In some embodiments, the calculation or obtaining the CFI may comprise analyzing both time and frequency domain features of the wireless channel associated with said STA and the AP 302.

As further described herein, the one or more STA's 304 can send, to the AP 302, CFI based on one or more thresholds. As described herein, the one or more STA's 304 can send CFI by piggybacking or attaching the CFI to an uplink data (e.g., PPDU 314).

The one or more threshold may indicate trigger conditions associated with CFI, such that when the trigger conditions are met (i.e., the threshold is satisfied), the one or more STA's 304 can feedback the CFI associated with the satisfied threshold.

In some embodiments, the one or more thresholds can be set or determined by the one or more STA's 304, in which, the one or more STA's defines thresholds associated with CFI, and when obtaining CFI, the one or more STA's 304 can determine if the one or more thresholds are satisfied.

In some embodiments, the one or more thresholds can be set or determined by the AP 302. The AP 302 can indicate one or more thresholds for CFI via a subfield in the enhanced trigger frame format as described in reference to FIG. 7. Accordingly, in an embodiment, the AP 302 can indicate one or more CFI feedback thresholds via a subfield (e.g., delayed CFI feedback threshold 720) in the trigger frame (e.g., BFRP trigger frame 310). The one or more STA's can feedback, via uplink data, e.g., PPDU 314, the CFI corresponding to one or more threshold that are satisfied.

In some embodiments, CFI includes information indicative of a level of channel variation.

The level of channel variation (e.g., variation of CFR) of the $f^{th}$ Resource Unit (RU) experienced by STA m between current channel sounding at time instance t and the last channel sounding at instance $t_{last}$ can be represented according to the following:

$$V_{k,f}[t] = \frac{1}{E} \sum_{m=fE}^{(f+1)E-1} \frac{1}{t - t_{last}} \cdot \left(1 - \frac{|vec(H_{m,k}^{last})vec(H_{m,k})^H|}{|vec(H_{m,k}^{last})| \cdot |vec(H_{m,k})|}\right) \quad (2)$$

where $H_{m,k}^{last}$ is the measured CFR in the last channel sounding and vec(•) is the vectorization function of a matrix, which converts the matrix into a column vector.

In equation (2), $V_{k,f}[t]$ can be inversely proportional to the correlation of channel vectors and directly proportional to the time duration between two channel sounding. This metric can reflect the channel variation speed and help AP (e.g., AP 302) determine how frequently the one or more STAs 304 can or should feedback the real-time CSI in the channel sounding process.

In some embodiments, CFI includes information indicative of a level of frequency-domain correlation.

The frequency-domain correlation may be based at least in part on the CIR. In the current channel sounding, at time instance t, the frequency-domain correlation of the channel between the $x^{th}$ receiver antenna of STA m and the $y^{th}$ transmitter antenna of AP 302 can be represented as follows:

$$C_{k,x,y}[t] = 1/\mathrm{sqrt}(\overline{\tau^2} - (\overline{\tau})^2) \quad (3)$$

where parameter $\bar{\tau}$ can represent the mean excess delay (i.e., the first moment of the power delay profile) according to the following:

$$\bar{\tau} = \sum_{l=1}^{L} |\alpha_{m,x,y,l}| \cdot \tau_{m,x,y,l} / \sum_{l=1}^{L} |\alpha_{m,x,y,l}| \quad (4)$$

and parameter $\bar{\tau^2}$ can represent the second central moment according to the following:

$$\bar{\tau^2} = \sum_{l=1}^{L} |\alpha_{m,x,y,l}| \tau_{m,x,y,l}^2 / \sum_{l=1}^{L} |\alpha_{m,x,y,l}| \quad (5)$$

In equation (3), $C_{k,x,y}[t]$ can be inversely proportional to Root Mean Square (RMS) delay spread, which can be a quantification of coherence bandwidth. This metric can help AP 302 to determine how many tones (subcarriers) a STA can group in the CSI feedback.

In some embodiments, CFI includes information indicative of a temporary sparsity level of CIR.

The sparsity level of a channel can be evaluated using a sparseness metric in matrix theory. In the current channel sounding, at time instance t, the sparsity level of the channel between the $x^{th}$ receiver antenna of STA m and the $y^{th}$ transmitter antenna, in sparseness metric, can be represented as follows:

$$T_{m,x,y}[t] = \frac{\sqrt{M} - \left(\sum_{l=1}^{K} |\beta_{m,x,y,l}|\right) / sqrt\left(\sum_{l=1}^{K} |\beta_{m,x,y,l}|^2\right)}{\sqrt{M} - 1} \quad (6)$$

where $\beta_{m,x,y,l}$ can represent the $k^{th}$ element in Equation (1).

Referring to equation (6), this metric can quantify the sparsity of CIR and can help AP 302 determine whether a STA should feedback CIR to the AP. If the CIR has high level of sparsity, less overhead to feedback CSI can be used. For example, if CIR is sparse, a more efficient transmission of a few samples of CIR in the time domain rather than full number of subcarriers of CSI in the frequency domain may be sufficient.

Embodiments described herein may provide for an opportunistic channel sounding with combined two types of channel information feedback (i.e., long-term channel information (CFI) and real-time CSI). Embodiments described herein may provide for an opportunistic transmission of CFI via piggybacking such information with traffic data in a data frame. The CFI can be determined based on some evaluated parameters, such as, the level of channel variations, the level of frequency-domain correlation and temporary sparsity level of CIR as described herein.

As described herein, adaptive delayed channel feature response feedback can be transmitted by a STA based on whether or not the predefined threshold(s) (i.e., trigger condition) on CFI, is satisfied.

In some embodiments, when a STA of the one or more STAs 304 receives a request to perform channel sounding, in response to the request, the one or more STAs can calculate, determine or obtain channel feature parameters including one or more of: level of channel variation (e.g., channel variation speed), the level of frequency-domain correlation, and temporary sparsity level of CIR. After determining the CFI, the STA can send the CFI to the AP 302 through the UL data payload if a trigger condition is satisfied. Based on the received feedback information (e.g., the CFI), the AP 302 can perform opportunistic channel sounding by providing instructions to the STA on which type of CSI feedback is preferred for the CSI feedback.

Figure 4:
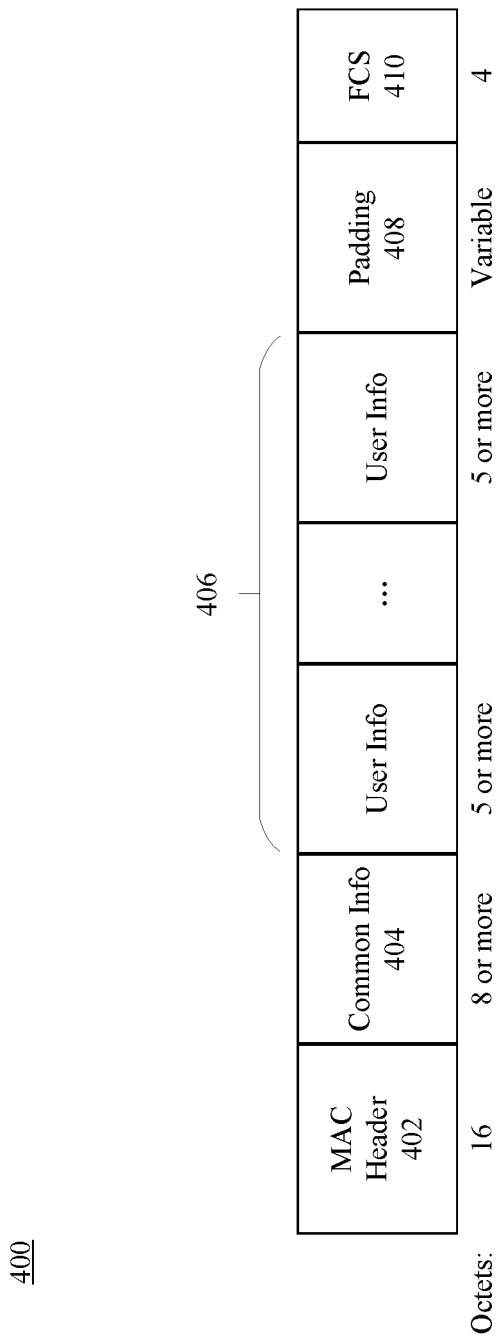
FIG. 4 illustrates a trigger frame format.

FIG. 4 illustrates a trigger frame format. The trigger frame format 400 may be similar to the trigger frame format in 802.11ax, sec 9.3.1.22 (High efficiency (HE)). The trigger frame format 400 can refer to the BFRP frame 310 and 320. As illustrated the trigger frame format 400 can comprise fields indicating one or more of: a medium access control (MAC) header 402, common info field 404, user info field 406, padding 408 and frame check sequence (FCS) 410. Each field of the trigger frame format can have appropriate size as illustrated.

In some embodiments, the channel sounding procedure 300 may comprise, after sending NDPA 308 and NDP 308 frames, AP 302 can set a feasible $Thr_V$, which can be carried in the delayed CFI feedback threshold subfield 720 in an extension of HE variant User Info field of the BFRP trigger frame (e.g., BFRP trigger frame 310), as illustrated in FIG. 7 and further described herein.

FIG. 5 illustrates trigger type subfield encoding. The trigger type table 500 may be similar to the trigger type subfield encoding in Sec. 9.3.1.22 of 802.11ax. The BFRP trigger frame variant can be indicated or identified by the trigger type subfield in the Common Info field (e.g., common info 404) of the trigger frame (e.g., trigger frame format 400).

Figures 6A, 6B:
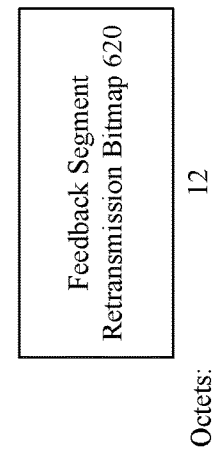
FIG. 6A illustrates a user info field format of a trigger frame.
FIG. 6B illustrates a trigger dependent user info subfield format.

FIG. 6A illustrates a user info field format of a trigger frame. The user info field format 600 may be a field format for the user Info field (e.g., user info 406) of a BFRP trigger frame. The user info field format 600 may be an HE variant User Infor field format, which may be similar to the User Info field format defined in Sec. 9.3.1.22, 802.11ax.

As illustrated the user info field format 600 can comprise one or more subfields indicating one or more of: association identifier (AID)12 602, RU allocation 604, UL forward error correction (FEC) coding type 606, UL HE-modulation and coding scheme (MCS) 608, UL dual carrier modulation (DCM) 610, spatial streams (SS) allocation/random access resource unit (RA-RU) information 612, UL target receive power 614, a reserved subfield 616, and trigger dependent user info 618. Each field of the user info field format 600 can have appropriate size as illustrated.

FIG. 6B illustrates a trigger dependent user info subfield format. The format 620 can be the format for the trigger dependent user info subfield in an HE BFRP trigger frame. The format 620 may be similar to the trigger dependent user info subfield format in the HE BFRP trigger frame in Sec. 9.3.1.22, 802.11ax. The format 620 may comprise a field indicating a feedback segment retransmission bitmap.

Embodiments described herein may provide for an enhanced user info field format in the BFRP trigger frame. The enhanced user info field format can be based on an extension of 802.11ax user info field. The enhanced user info field format may allow transmission of delayed CFI feedback threshold for adaptive delayed CFI feedback.

FIG. 7 illustrates an enhanced user info field format in the BFRP trigger frame, according to an embodiment of the present disclosure.

In an embodiment, the enhanced user info field format 700 can comprise one or more subfields indicating one or more of: AID12 702 (can be allocated 12 bits), RU allocation 704 (can be allocated 8 bits), UL FEC coding type 706 (can be allocated 1 bit), UL MCS 708 (can be allocated 4 bits), UL DCM 710 (can be allocated 1 bit), SS allocation/RA-RU information 712 (can be allocated 6 bits), UL target receive power 714 (can be allocated 7 bits), an extension indication (can be allocated 1 bit), feedback segment retransmission bitmap 718 (can be allocated 8 bits), and delayed CFI feedback threshold 720 (can be allocated 8 or more bits).

In an embodiment, comparing the enhanced format 700 with the format 600, the extension indication subfield 716 in the format 700 replaces the Reserved subfield 616 in the format 600. The inclusion or presence of the extension indication subfield 716 can be accomplished by setting the reserved subfield 616 to '1', which can further indicate the inclusion or presence of the delayed CFI feedback threshold subfield 720 in the BFRP trigger frame.

The delayed CFI feedback threshold subfield 720 can indicate one or more thresholds related to CFI. As discussed herein, CFI comprises, among other related channel information, channel feature parameters indicative of one or more of: level of channel variations, level of frequency-domain correlation, and temporary sparsity level of CIR.

In an embodiment, after completing or performing channel measurement, STA m, of the one or more STAs 304, can calculate or determine the CFI and determine if the one or more trigger conditions are satisfied. The one or more trigger conditions may refer to one or more thresholds related to CFI as indicated in the delayed CFI feedback threshold 720 in the enhanced user info field format 700 in the BFRP trigger frame.

In an embodiment, if the one or more trigger conditions is not satisfied, STA m may not feedback the CFI to AP 302.

Figure 8:
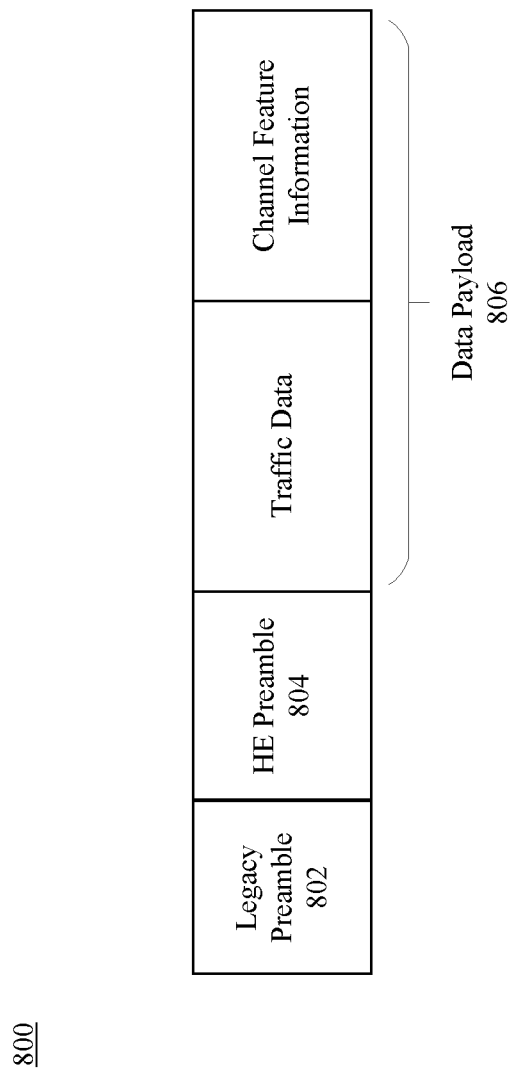
FIG. 8 illustrates a physical layer (PHY) protocol data unit (PPDU) format comprising channel feature information (CFI), according to an embodiment of the present disclosure.

In an embodiment, if the one or more trigger conditions described above is satisfied, STA m may send the CFI associated with the one or more trigger conditions to AP (e.g., AP 302). In an embodiment, STA m may send the associated CFI via piggybacking said information in the data payload of UL physical layer (PHY) protocol data unit (PPDU), as shown in FIG. 8. Accordingly, when the STA m has an opportunity to send the UL data to the AP, the STA m can piggyback the associated channel information in the data payload of the UL data.

FIG. 8 illustrates a physical layer (PHY) protocol data unit (PPDU) format comprising CFI, according to an embodiment of the present disclosure. The PPDU format 800 may comprise one or more fields indicating one or more of: legacy preamble 802, HE preamble 804 and data payload 806. In an embodiment, the data payload 806 can comprise one or more of traffic data and CFI. The PPDU format 800 illustrates piggybacking of CFI in the UL data payload.

Embodiments described herein may provide for an enhanced user info field (e.g., user info field format 700) that allows for the inclusion of the delayed CFI feedback threshold subfield 720 in the extension of HE variant User Info field in the BFRP trigger frame. In some embodiments, the delayed CFI feedback threshold subfield 720 may indicate one or more trigger conditions being one or more threshold associated with CFI. In some embodiments, the presence of the delayed CFI feedback threshold may indicate or signal that a STA (e.g., one or more STAs 304) is to transmit to the AP 302 CFI (delayed CFI feedback) based the one or more trigger conditions. In some embodiments, the STA of the one or more STAs 304 can feedback the relevant CFI to AP via including the relevant CFI in the uplink PPDU.

In the channel sounding procedure (e.g., channel sounding procedure 300), after collecting and analyzing the CFI sent from one or more STAs 304, AP 302 may then have knowledge of the pattern of the one or more relevant wireless channels.

Referring to channel sounding procedure 300, the AP may have knowledge of the pattern of the one or more relevant wireless channels associated with the one or more STAs 304 after the real-time CSI feedback portion 330 and the delayed CFI feedback portion 335. In such embodiments, the channel sounding at time t, which involves the real-time CSI feedback portion 330 and the delayed CFI feedback portion 335 may be the initial or the first channel sounding phase. Accordingly, channel sounding at time t+T (a subsequent channel sounding phase), referring to the real-time CSI feedback portion 340 and the delayed CFI feedback portion (not shown), the AP can request, from the one or more STAs 304, channel information (e.g., real-time CSI, and CFI) when needed. This is because the AP 302 at time t+T may have knowledge of the pattern of the one or more relevant wireless channels, based on channel sounding at time t (e.g., the real-time CSI feedback portion 330 and the delayed CFI feedback portion 335). Accordingly, the AP 302 can send an NDPA frame 316 to provide instruction to the one or more STAs 304 on what channel information (e.g., one or both of: real-time CSI and delayed CFI), and the type of information in each type of feedback (e.g., what type of information to be included in the real-time CSI feedback, and/or the delayed CFI feedback) to feedback to the AP. For example, the NDPA frame 316 can comprise one or more subfields in the STA info field, as further described in reference to FIG. 10, to indicate what channel information (e.g., real-time CSI and/or CFI) and the type of information in each type of feedback to be provided by the one or more STAs.

In some embodiments, the channel sounding at time t may be not be the first or initial channel sounding phase. Thus, the AP 302 may already have knowledge of the of the pattern of the one or more relevant wireless channels based on a previous one or more channel sounding phase. Thus, at the channel sounding at time t (referring to the real-time CSI feedback portion 330 and the delayed CFI feedback portion 335) the AP can send an NDPA frame 306 to provide instruction to the one or more STAs 304 on what channel information (e.g., one or both of: real-time CSI and delayed CFI), and the type of information in each type of feedback (e.g., what type of information to be included in the real-time CSI feedback, and/or the delayed CFI feedback) to provide the AP. For example, the NDPA frame 306 can comprise one or more subfields in the STA info field, as further described in reference to FIG. 10, to indicate what channel information (e.g., real-time CSI and/or delayed CFI) and the type of information in each type of feedback to be provided by the one or more STAs to the AP.

Accordingly, in an embodiment, the AP 302 can request from the one or more STAs 304 to send channel information (e.g., real-time CSI and delayed CFI) when needed. In some embodiments, the AP 302 can indicate a format for the channel information feedback to be sent by the one or more STAs 304. In some embodiments, the requested format of the Channel information feedback can be CIR or CFR or other formats as described herein.

Accordingly, embodiments described herein may provide for obtaining channel information when needed. Embodiments may further provide for obtaining channel information feedback in a preferred format. Thus, embodiments described herein may provide for reduced feedback overhead (e.g., CSI feedback overhead) while maintaining a accurate and timely channel information.

Embodiments described herein may provide for sending, by an AP, one or more instructions to one or more STAs on how to feedback channel information. In some embodiments, instructions on how to feedback channel information can be indicated in the STA info field of the NDPA frame (e.g., NDPA 306 or 316). In some embodiments, the EHT variant NDPA frame (e.g., NDPA frame in 802.11be D1.3) can be modified or enhanced to include in its STA info field one or more instructions on how to feedback channel information.

Figure 9A:
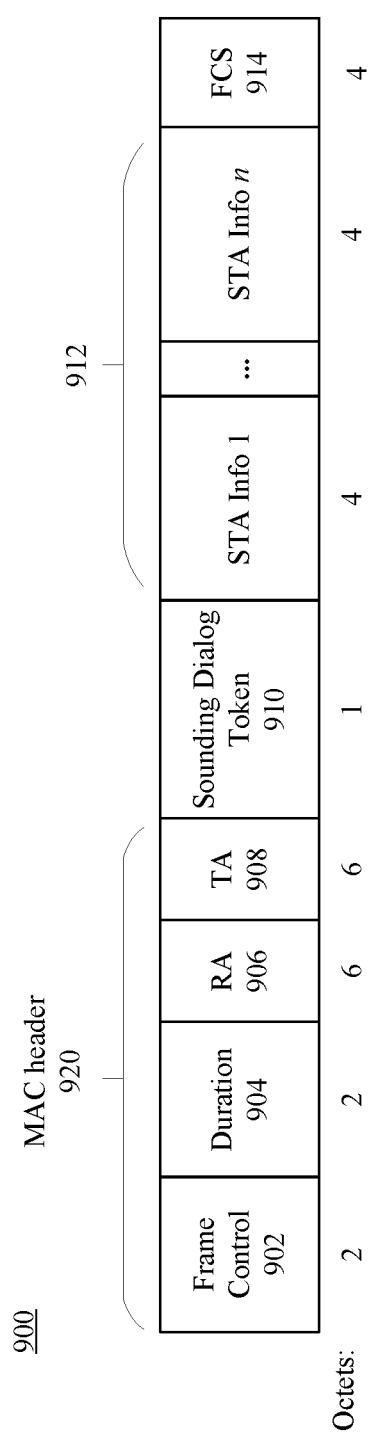
FIG. 9A illustrates a high efficiency (HE)/EHT variant null data packet announcement (NDPA) frame format.

FIG. 9A illustrates an HE/EHT variant NDPA frame format. The frame format 900 may refer to the frame format of the HE/EHT variant NDPA frame formant in sec. 9.3.1.19, 802.11ax-2020. The frame format 900 can comprise one or more fields indicating one or more of: frame control 902, duration 904, receiver address (RA) 906, transmitter address (TA) 908, MAC header 920, a sounding dialog token 910, a STA info 912, and FCS 914. As illustrated, the MAC header 920 can comprise one or more of: frame control field 902, duration field 904, RA field 906 and TA field 908.

Figure 9B:
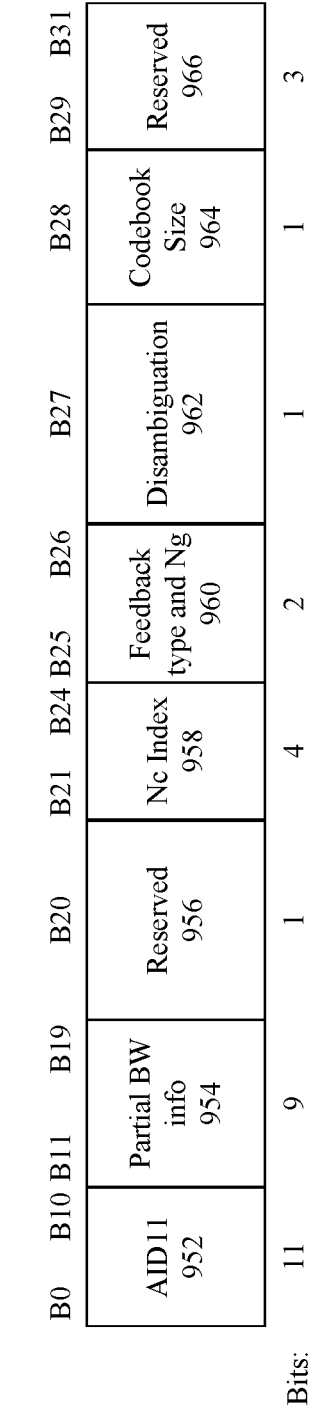
FIG. 9B illustrates a STA info field format in EHT variant NDPA frame.

FIG. 9B illustrates a STA info field format in EHT variant NDPA frame. The field format 950 may be the STA info field format of EHT variant NDPA frame in Sec. 9.3.1.19, 802.11be D1.0. The field format 950 can comprise one or more subfields indicating one or more of: AID11 952, partial bandwidth (BW) info 954, a reserved subfield 956, Nc Index (Nc is the number of columns in the compressed beamforming feedback matrix) 958, feedback type and Ng (Ng is the number of grouping subcarriers) 960, disambiguation 962, codebook size 964, and a reserved field 966.

In some embodiments, the STA info field (e.g., STA info field format 95) in EHT variant NDPA frame may be modified or enhanced by adding one or more subfields for indicating one or more of: real-time CSI feedback and delayed CFI feedback.

FIG. 10 illustrates an enhanced STA info field format, according to an embodiment of the present disclosure. The enhanced STA info field format 1000 can be a modification or enhancement to the STA Info field of the EHT variant NDPA frame.

In an embodiment, the enhanced STA info field format 1000 can comprise one or more subfields indicating one or more of: AID11 1002, partial bandwidth (BW) info 1004, a reserved subfield 1006, Nc Index (Nc is the number of columns in the compressed beamforming feedback matrix) 1008, feedback type and Ng (Ng is the number of grouping subcarriers) 1010, disambiguation 1012, codebook size 1014, a reserved subfield 1016, CSI feedback indication 1018, real-time CSI indication 1020, and delayed CFI indication 1022.

Each subfield in the enhanced STA info field format 1000 can be allocated an appropriate size as illustrated. In some embodiments, the CSI feedback indication subfield 1018 can be 2 bits.

In some embodiments, the AP 302 can set the CSI feedback indication subfield 1018 to indicate real-time CSI feedback only. For example, the AP 302 can set the CSI feedback indication subfield 1018 to '00' to request, from the one or more STAs 304, real-time CSI feedback only. Accordingly, in response to receiving the NDPA frame having a CSI feedback indication subfield 1018 set to indicate real-time CSI feedback only, the one or more STAs 304 can respond with real-time CSI in the BR frames (e.g., BR frames 312 or 322).

In some embodiments, the AP 302 can set the CSI feedback indication subfield 1018 to indicate delayed CFI feedback only. For example, the AP 302 can set the CSI feedback indication subfield 1018 to '01' to request, from the one or more STAs 304, the delayed CFI feedback only. Accordingly, in response to receiving the NDPA frame having a CSI feedback indication subfield 1018 indicating delayed CFI feedback only, the one or more STAs 304 can respond with delayed CFI only by piggybacking the delayed CFI with a PPDU as described herein.

In some embodiments, the indication for delayed CFI feedback only (e.g., setting the CSI feedback indication subfield 1018 to '01') can indicate that the one or more STAs 304 need not feedback real-time CSI. Thus, in response to receiving such indication, the one or more STAs may not feedback real-time CSI. In such embodiments, while the one or more STAs 304 may not feedback real-time CSI, the one or more STAs 304 can still perform channel information measurement (e.g., CSI, CFI measurement) and decide whether or not to feedback CFI to the AP.

In some embodiments, the AP 302 can set the CSI feedback indication subfield 1018 to indicate both real-time CSI and delayed CFI feedback. For example, the AP 302 can set the CSI feedback indication subfield 1018 to '10' to request, from the one or more STAs 304, both real-time CSI and delayed CFI feedback. Accordingly, in response to receiving the NDPA frame having a CSI feedback indication subfield 1018 to indicate both real-time CSI and delayed CFI feedback, the one or more STAs 304 receiving can respond with real-time CSI in the BR frames (e.g., BR frames 312, or 322), and further respond with delayed CFI by piggybacking the delayed CFI with a PPDU as described herein.

In some embodiments, the setting '11' for the CSI feedback indication subfield 1018 can be reserved.

In some embodiments, the real-time CSI indication subfield 1020 can be allocated an appropriate bit size, e.g., n1 bits. In some embodiments, the real-time CSI indication subfield 1020 can indicate the type of information the one or more STAs should feedback in real-time CSI feedback. In some embodiments, the real-time CSI indication subfield 1020 can indicate that the real-time CSI feedback should include one or more of compressed CSI, CFR and CIR.

In some embodiments, the delayed CFI indication subfield 1022 can be allocated an appropriate bit size, e.g., n2 bits. In some embodiments, the real-time CSI indication subfield 1020 can indicate the type of information the one or more STAs should feedback in delayed CFI feedback. In some embodiments, the delayed CFI indication subfield 1022 can indicate that the delayed CFI feedback should include one or more of compressed CSI, CFR, CIR and channel feature parameters. As discussed herein, channel feature parameters include information indicative of one or more of: the level of channel variations, level of frequency-domain correlation, and temporary sparsity level of channel impulse response.

Embodiments described herein may provide for improved CSI feedback using enhanced STA info field formats which include indications for CSI feedback, real-time CSI and delayed CFI.

Embodiments described herein may provide for an opportunistic channel sounding based on the latency tolerance of CFI. In some embodiments, the opportunistic channel sounding may provide for real-time CSI feedback. In some embodiments, the opportunistic channel sounding may further provide for delayed CFI feedback. In some embodiments, the delayed CFI feedback is performed by piggybacking the delayed CFI with traffic data in a data frame.

Embodiment described herein may further provide for an enhanced user info field format in the BFRP trigger frame, the enhanced user info field format comprising a subfield for delayed CFI feedback threshold. Embodiments described herein may further provide for an enhanced STA info field format in the NDPA frame for efficient CFI feedback.

Figure 11:
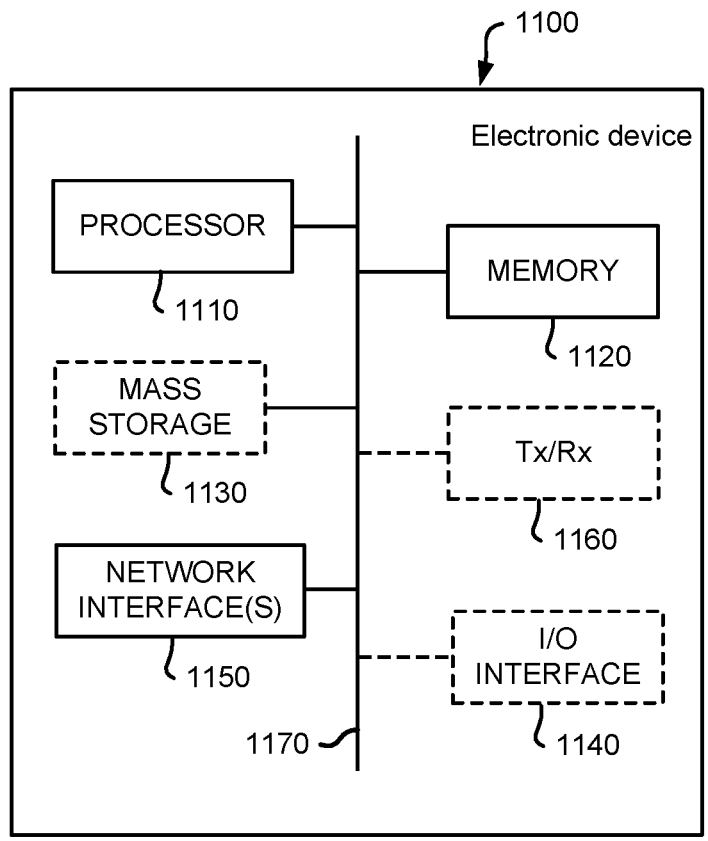
FIG. 11 is a schematic diagram of an electronic device that may perform any or all of operations of the above methods and features explicitly or implicitly described herein, according to different embodiments of the present invention.

FIG. 11 is a schematic diagram of an electronic device 1100 that may perform any or all of operations of the above methods and features explicitly or implicitly described herein, according to different embodiments of the present invention. For example, a computer equipped with network function may be configured as electronic device 1100. In some embodiments, the electronic device may be a device that connects to the network infrastructure over a radio interface, such as a mobile phone, smart phone or other such device that may be classified as a user equipment (UE). In some embodiments, the electronic device 1100 may be a Machine Type Communications (MTC) device (also referred to as a machine-to-machine (m2m) device), or another such device that may be categorized as a UE despite not providing a direct service to a user. In some references, an ED may also be referred to as a mobile device, a term intended to reflect devices that connect to mobile network, regardless of whether the device itself is designed for, or capable of, mobility. In some embodiments, electronic device 1100 may be used to implement one or more embodiments described herein. For example, the electronic device 1100 may be configured to perform operations performed by an AP or a beamformer, a STA or beamformee, or the like as appreciated by a person skilled in the art.

As shown, the electronic device 1100 may include a processor 1110, such as a Central Processing Unit (CPU) or specialized processors such as a Graphics Processing Unit (GPU) or other such processor unit, memory 1120, non-transitory mass storage 1130, input-output interface 1140, network interface 1150, and a transceiver 1160, all of which are communicatively coupled via bi-directional bus 1170. According to certain embodiments, any or all of the depicted elements may be utilized, or only a subset of the elements. Further, electronic device 1100 may contain multiple instances of certain elements, such as multiple processors, memories, or transceivers. Also, elements of the hardware device may be directly coupled to other elements without the bi-directional bus. Additionally, or alternatively to a processor and memory, other electronics, such as integrated circuits, may be employed for performing the required logical operations.

The memory 1120 may include any type of non-transitory memory such as static random access memory (SRAM), dynamic random access memory (DRAM), synchronous DRAM (SDRAM), read-only memory (ROM), any combination of such, or the like. The mass storage element 1130 may include any type of non-transitory storage device, such as a solid state drive, hard disk drive, a magnetic disk drive, an optical disk drive, USB drive, or any computer program product configured to store data and machine executable program code. According to certain embodiments, the memory 1120 or mass storage 1130 may have recorded thereon statements and instructions executable by the processor 1110 for performing any of the aforementioned method operations described above.

Embodiments of the present invention can be implemented using electronics hardware, software, or a combination thereof. In some embodiments, the invention is implemented by one or multiple computer processors executing program instructions stored in memory. In some embodiments, the invention is implemented partially or fully in hardware, for example using one or more field programmable gate arrays (FPGAs) or application specific integrated circuits (ASICs) to rapidly perform processing operations.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disc read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include a number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method by an access point (AP), the method comprising:

sending, to one or more stations (STAs), a request for channel information related to one or more channels between the AP and the one or more STAs, the request associated with a first channel sounding phase; and receiving, from the one or more (STAs), one or more physical layer (PHY) protocol data units (PPDUs) comprising channel feature information (CFI) associated with the one or more channels, wherein the CFI is received in a data frame which also includes traffic data, and wherein the CFI is received after channel state information (CSI) provided by the one or more STAs in response to the first channel sounding phase.

2. The method of claim 1, wherein the request comprises a beamforming report poll (BFRP) trigger frame comprising a user information field including a first subfield for indicating one or more thresholds associated with one or more parameters of the channel feature information; and wherein the received channel feature information is based on the one or more thresholds.

3. The method of claim 2, wherein presence of the first subfield is indicated via a second subfield in the user information field.

4. The method of claim 2, wherein the one or more parameters indicate one or more of: a level of channel variation, a level of frequency-domain correlation, and temporary sparsity level of channel impulse response (CIR).

5. The method of 1, wherein:
the channel feature information is in data payload portion of the one or more PPDUs; and
the channel information comprises information indicative of one or more of: channel state information (CSI), channel quality information, channel frequency response (CFR), channel impulse response (CIR), a level of channel variation, a level of frequency domain correlation, and a temporary sparsity level of CIR.

6. The method of claim 1 further comprising:
receiving, from the one or more STA, one or more beamforming report (BR) frames comprising real-time channel state information (CSI) based on the request of the first channel sounding phase; and
sending, to the one or more STAs, a second request for at least one of: additional real-time CSI feedback and additional CFI feedback, wherein:
the second request is associated with a second channel sounding phase subsequent to the first channel sounding phase;
the second request comprises a null data packet announcement (NDPA) frame including a STA info field, the STA info field comprising a first subfield indicating the request; and
the second request is based on at least one of: the received real-time CSI and the received CFI.

7. The method of claim 6 further comprising: receiving, from the one or more STAs, one of:
one or more additional BR frames comprising the additional real-time CSI;
one or more additional PPDUs comprising the additional CFI; and
one or more additional BR frames comprising the additional real-time CSI and one or more additional PPDUs comprising the additional CFI.

8. The method of claim 6, wherein the STA info field comprises a second subfield for indicating the type of information the one or more STAs should feedback for the additional real-time CSI, the type of information comprising one or more of: compressed CSI, channel frequency response (CFR), and channel impulse response (CIR).

9. The method of claim 6, wherein the STA info field comprises a second subfield for indicating the type of information the one or more STAs should feedback for the additional CFI, the type of information comprising one or more of: compressed CSI, channel frequency response (CFR), channel impulse response (CIR), a level of channel variation, a level of frequency-domain correlation, and a temporary sparsity level of CIR.

10. A method by an access point (AP), the method comprising:
sending, to one or more stations (STAs), a request for: real-time channel state information (CSI) feedback and channel feature information (CFI) feedback, wherein:
the request includes a null data packet announcement (NDPA) frame including a STA info field, the STA info field including a first subfield indicating the request;
receiving, from the one or more STA, channel information comprising
the real-time CSI and the CFI, wherein the CFI is received in a data frame which also includes traffic data, and wherein the data frame is transmitted after the CSI feedback.

11. The method of claim 10, wherein the receiving comprises receiving one of:
one or more beamforming report (BR) frames comprising the real-time CSI;
one or more physical layer (PHY) protocol data units (PPDUs) comprising the CFI; and
one or more BR frames comprising the real-time CSI and one or more PPDUs comprising the CFI.

12. The method of claim 10, wherein the STA info field comprises one or more additional subfields for indicating the type of information the one or more STAs should feedback for the real-time CSI and the CFI, the type of information comprising one or more of: compressed CSI, channel frequency response (CFR), channel impulse response (CIR), a level of channel variation, a level of frequency domain correlation, and a temporary sparsity level of CIR.

13. An apparatus comprising:
at least one processor and at least one machine-readable medium storing executable instructions which when executed by the at least one processor configure the apparatus for:
sending, to one or more stations (STAs), a request for channel information related to one or more channels between an access point (AP) and the one or more STAs, the request associated with a first channel sounding phase; and
receiving, from the one or more of the at least one (STA), one or more physical layer (PHY) protocol data units (PPDUs) comprising channel feature information (CFI) associated with the one or more channels, wherein the CFI is received in a data frame which also includes traffic data, and wherein the CFI is received after channel state information (CSI) provided by the one or more STAs in response to the first channel sounding phase.

14. The apparatus of claim 13, wherein the request comprises a beamforming report poll (BFRP) trigger frame comprising a user information field including a first subfield for indicating one or more thresholds associated with one or more parameters of the channel feature information; and wherein the received channel feature information is based on the one or more thresholds.

15. The apparatus of claim 14, wherein presence of the first subfield is indicated via a second subfield in the user information field.

16. The apparatus of claim 14, wherein the one or more parameters indicate one or more of: a level of channel variation, a level of frequency-domain correlation, and temporary sparsity level of channel impulse response (CIR).

17. The apparatus of claim 13, wherein:
the channel feature information is in data payload portion of the one or more PPDUs; and
the channel information comprises information indicative of one or more of: channel state information (CSI), channel quality information, channel frequency response (CFR), channel impulse response (CIR), a level of channel variation, a level of frequency domain correlation, and a temporary sparsity level of CIR.

18. The apparatus of claim 13, wherein the executable instructions which when executed by the at least one processor further configure the apparatus for:
receiving, from the one or more STA, one or more beamforming report (BR) frames comprising real-time channel state information (CSI) based on the request of the first channel sounding phase; and
sending, to the one or more STAs, a second request for at least one of: additional real-time CSI feedback and additional CFI feedback, wherein:
the second request is associated with a second channel sounding phase subsequent to the first channel sounding phase;
the second request comprises a null data packet announcement (NDPA) frame including a STA info field, the STA info field comprising a first subfield indicating the request; and
the second request is based on at least one of: the received real-time CSI and the received CFI.

19. The apparatus of claim 18, wherein the executable instructions which when executed by the at least one processor further configure the apparatus for:
receiving, from the one or more STAs, one of:
one or more additional BR frames comprising the additional real-time CSI;
one or more additional PPDUs comprising the additional CFI; and
one or more additional BR frames comprising the additional real-time CSI and one or more additional PPDUs comprising the additional CFI.

20. The apparatus of claim 18, wherein the STA info field comprises one or more additional subfields for indicating the type of information the one or more STAs should feedback for the additional real-time CSI and the additional CFI, the type of information comprising one or more of: compressed CSI, channel frequency response (CFR), channel impulse response (CIR), a level of channel variation, a level of frequency domain correlation, and a temporary sparsity level of CIR.

* * * * *